United States Patent [19]
Yasrebi et al.

[11] Patent Number: 5,643,844
[45] Date of Patent: Jul. 1, 1997

[54] METHOD FOR STABILIZING CERAMIC SUSPENSIONS

[75] Inventors: Mehrdad Yasrebi, Clackamas; Mark Edwin Springgate, Portland, both of Oreg.; Douglas Gene Nikolas, Battleground, Wash.; William Warren Kemp, Milwaukie, Oreg.; David Howard Sturgis, Gladstone, Oreg.; Renee Van Ginhoven, Seattle, Wash.

[73] Assignee: Precision Castparts Corporation, Portland, Oreg.

[21] Appl. No.: 312,694

[22] Filed: Sep. 27, 1994

[51] Int. Cl.$^6$ .................................................. C04B 35/505
[52] U.S. Cl. ..................... 501/152; 106/38.22; 106/38.9; 164/519; 164/517; 164/516
[58] Field of Search .......................... 501/152; 106/38.22, 106/38.9; 164/519, 517, 516

[56] References Cited

U.S. PATENT DOCUMENTS

| | | | |
|---|---|---|---|
| 3,545,987 | 12/1970 | Anderson | 501/152 |
| 4,040,845 | 8/1977 | Richerson et al. | 106/38.9 |
| 4,097,292 | 6/1978 | Husby et al. | 501/127 |
| 4,166,831 | 9/1979 | Rhodes et al. | 501/152 |
| 4,703,806 | 11/1987 | Lassow et al. | 164/518 |
| 4,947,927 | 8/1990 | Horton | 164/517 |
| 4,996,175 | 2/1991 | Sturgis | 501/152 |

OTHER PUBLICATIONS

G.M. Crosbie, "Ion–Exchange Treatment of Silicon–Yttria Dispersions", *J. Am. Ceram. Soc.*, 68[3] C–83–C84 (1985). no month.

*Primary Examiner*—Melissa Bonner
*Attorney, Agent, or Firm*—Klarquist Sparkman Campbell Leigh & Whinston, LLP

[57] ABSTRACT

Time-stable yttria slurries, and a method for forming such yttria slurries and articles therefrom are described. The method involves forming an intimate mixture comprising yttria and at least about 0.1 weight percent of a dopant material. An aqueous slurry is then formed comprising from about 1 weight percent to about 95 weight percent of the intimate mixture. The intimate mixture may be formed by heating the mixture to a temperature sufficient to calcine the mixture. Alternatively, the intimate mixture may be formed by heating the mixture to a temperature sufficient to fuse the mixture. The dopant also may be provided as a surface coating on the yttria particles. The dopant material comprises an oxide or hydroxide, or combinations thereof, or compounds that form such oxides or hydroxides upon further processing, wherein the metal oxides or hydroxides are of metals selected from the group consisting of aluminum, titanium, niobium, tantalum, silicon, hafnium, tin, gallium, indium, beryllium, thorium, boron, scandium, vanadium, chromium, ruthenium, rhodium, iridium, palladium, platinum, copper, germanium, bismuth, tellurium, erbium, thulium, ytterbium, lutetium, neptunium, plutonium, and combinations thereof. The aqueous suspension may further comprise other materials, such as other ceramic or metallic particles, co-solvents, dispersing agents, surfactants, inorganic binders, or organic binders.

40 Claims, 7 Drawing Sheets

METHOD FOR STABILIZING CERAMIC SUSPENSIONS

FIELD OF THE INVENTION

This invention concerns ceramic compositions and a method for stabilizing such compositions.

BACKGROUND OF THE INVENTION

Yttria (yttrium oxide, $Y_2O_3$) is used commercially in a variety of applications because of its chemical stability and refractory nature. A refractory material is any of various substances, such as ceramics, that are characterized by their suitability for use as structural materials at high temperatures. A ceramic is a hard, brittle, heat-and corrosion-resistant material that may be produced by forming the ceramic particles into a desired shape and then firing the shape to its final density. Yttria also is used extensively as a component for industrially important ceramics, such as zirconia and silicon-nitride based materials and high $T_c$ superconductors.

Aqueous suspensions of yttria particles are used industrially to form ceramic articles. A suspension is a system in which small particles, typically solid particles, are uniformly dispersed in a liquid, such as water. Ceramic suspensions that are used commercially to make ceramic objects commonly are multi-component compositions. For instance, commercial ceramic slurries typically include processing aids, such as dispersing agents, co-solvents and binding agents. Ceramic slurries also may include materials that are to be incorporated into the final ceramic product, such as strengthening agents, stabilizing agents, and sintering aids.

Aqueous ceramic processing is preferred for processing ceramics, primarily because aqueous processing is cheap and relatively environmentally safe. Aqueous processing of some ceramics is difficult because ceramic materials normally are at least partially soluble in water. Furthermore, ceramics hydrate in aqueous systems, which means that the ceramic particles react with water to form a chemical bond. The compounds that result from the hydration are referred to as hydrates. If hydration and/or dissolution of the particles occurs extensively in aqueous environments, then subsequent aqueous processing becomes difficult or impractical.

Ceramic particles also tend to agglomerate in water. Agglomerated suspensions are not useful for most applications, and must be disposed of at considerable expense and loss of material. The extent and rate of ceramic dissolution, hydration or agglomeration in water depends on many factors, including the nature of the ceramic, the oxidation state of the ceramic, the pH of the system and the temperature of the system.

For commercial applications, the properties of a slurry preferably do not change over time. Persons skilled in the art of ceramic processing continually seek methods for forming colloidal ceramic suspensions that are stable for relatively longer periods of time. That is, persons skilled in the art have sought methods for preventing particle agglomeration, while simultaneously reducing the dissolution and hydration rates.

Previous known attempts to make low-pH, aqueous yttria slurries that are stable for periods of up to about a week have been unsuccessful. For instance, Lassow's U.S. Pat. No. 4,703,806 states that an aqueous slurry of yttria and colloidal silica gels prematurely. Once the slurry gels, it is no longer useful for ceramic processing.

Figure 1:
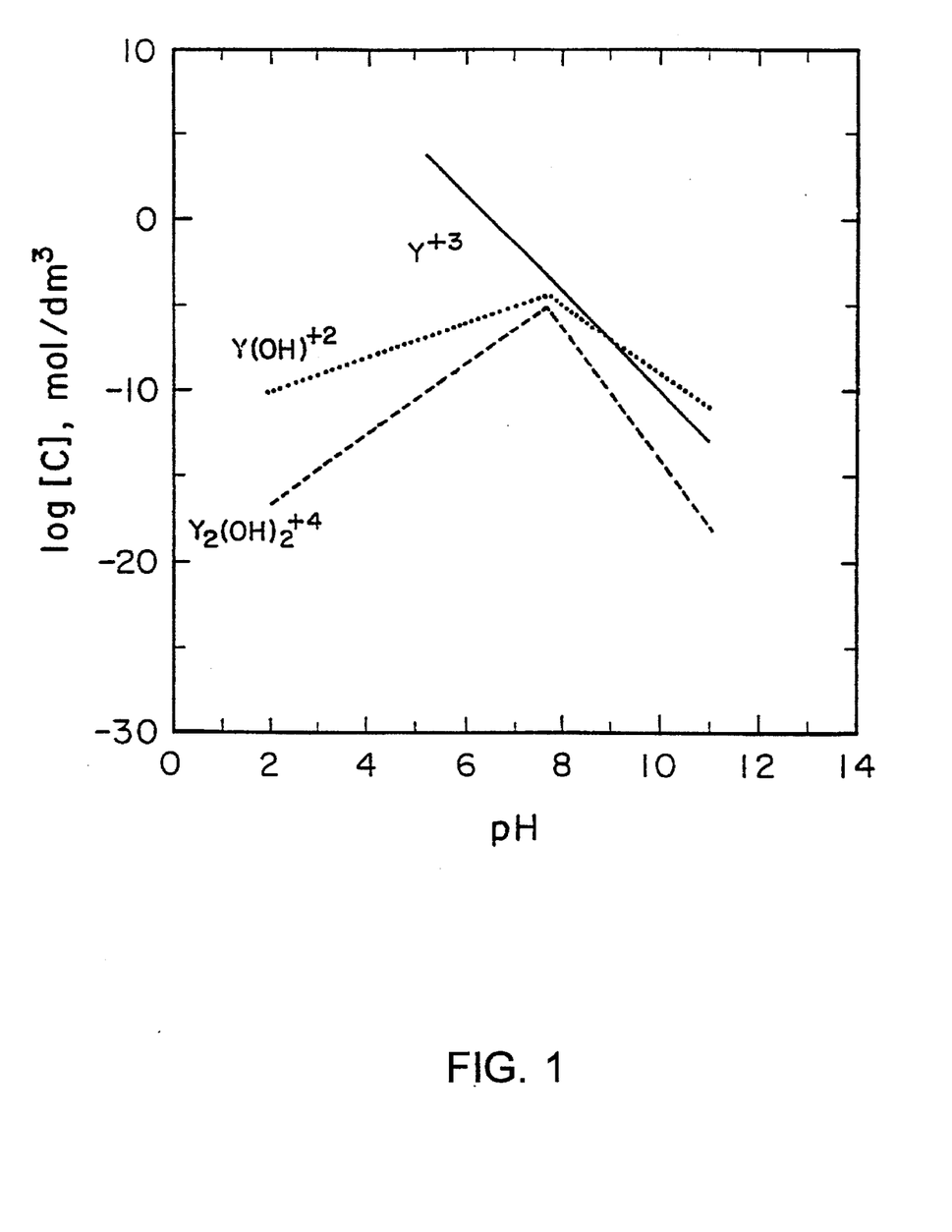
FIG. 1 is a graph showing the dissolution of yttria in water at different pH values, and the ionic species formed as a result thereof.

As another approach, Horton's U.S. Pat. No. 4,947,927 recites that an aqueous yttria slurry having a colloidal silica binder does not gel prematurely as long as the slurry has a pH of at least 10.2, and preferably greater than about 11.0. Horton specifically recites that a slurry having a pH of less than 10.2 experienced premature gelation after only six days. As illustrated by FIG. 1, a small drop in the pH from 11 to only 10.5 will increase the concentration of dissolved yttrium by more than one order of magnitude, and may cause premature gelation of the slurry. Maintaining the pH of yttria slurries in a production environment above 11 at all times creates production difficulties. Furthermore, compositions exhibit increased toxicity as the pH varies significantly from a neutral pH value. For these reasons, it is preferable to make yttria slurries less pH sensitive and at pH values less than about 11, in direct contrast to the teachings of Horton.

Another known approach for reducing the aging of yttria slurries is to reduce the concentration of dissolved yttrium ions by removing such ions from the slurry as they dissolve. This approach is relatively expensive and inefficient for high-volume slurry applications. An example of this approach is disclosed by G. M. Crosbie, "Ion-Exchange Treatment of Silicon-Yttria Dispersions" *J. Am. Ceram. Soc.*, 68 [3] C-83-4 (1985). Crosbie kept his silicon-yttria suspension stable for at least 24 days using an ion-exchange process which involved exchanging the dissolving polyvalent ions with monovalent ammonium ions.

In summary, a need exists for an improved aqueous yttria-containing slurries which resists gelation over time.

SUMMARY OF THE INVENTION

The present invention provides time-stable yttria slurries, articles made from such slurries, and a method for reducing the concentration of dissolving yttrium ions from yttrium-oxide particles in such slurries versus time by reducing the dissolution rate of yttria. This can be accomplished at any pH according to the present invention, thereby making it possible to produce the slurries at less toxic pH ranges. The method is highly effective in reducing the aging of yttria-based slurries. The present invention also encompasses the use of compositions comprising an aqueous slurry of yttria particles doped with an amount of a dopant effective to reduce the dissolution rate of yttria. One skilled in the art will realize that an "effective amount" may vary from composition to composition. However, an effective amount typically means an amount of at least about 0.1 weight percent.

The dopant material is an oxide or hydroxide, or combinations thereof, or compounds that form such oxides or hydroxides upon further processing, wherein the oxides or hydroxides are of metals selected from the group consisting of aluminum, titanium, niobium, tantalum, silicon, hafnium, tin, gallium, indium, beryllium, thorium, boron, scandium, vanadium, chromium, ruthenium, rhodium, iridium, palladium, platinum, copper, germanium, bismuth, tellurium, erbium, thulium, ytterbium, lutetium, neptunium, plutonium, and combinations thereof. Preferably, the metal is selected from the group consisting of aluminum, titanium, niobium, tantalum, silicon, hafnium, tin, gallium, indium, beryllium, thorium, and combinations thereof. Especially preferred metals are selected from the group consisting of aluminum, titanium and combinations thereof.

Doped yttria particles according to the present invention are not simply a binary mixture of the dopant and yttria. Instead, the phrase "doped yttria particles," or similar phrases used herein, refers to an intimate mixture of yttria and the dopant. "Intimately mixed" or "intimate mixture" is used to differentiate binary mixtures that result simply from the physical combination of two components. Typically, an "intimate mixture" means that the dopant material is atomically dispersed in yttria, such as with a solid solution or as small precipitates in the crystal matrix of the solid yttrium oxide. Alternatively, an intimate mixture may refer to compounds that are fused, such as, fused yttria-alumina or fused yttria-titania. By way of example and without limitation, the dopants may be intimately mixed with yttria in the following ways: (1) finely dispersed in the yttria matrix; (2) provided as a coating on the surface of the yttria particles; or (3) provided as a diffused surface layer of dopant on the outer surface of the yttria particles. The dopant may be in solid solution with yttria, or it may be in the form of small precipitates in the crystal matrix of the solid yttrium oxide, or it may be a coating on the surface of the particle or portions thereof. When the dopant is in the form of small precipitates, the more dispersed the precipitate is in the yttria the more effective it will be in stabilizing the yttria in aqueous systems.

Without limiting the scope of this invention to one theory of operation, it currently is believed that the dopant shields dissolution sites on the surface of yttrium oxide from attack by solvent molecules, such as water. In other words, the dissolution and/or hydration of yttria particles primarily is a surface reaction, and the dopant interferes with this surface reaction. Consequently, the dissolution rate of yttrium oxide is decreased. For this reason and in the absence of any particle breakage, only a minor portion of the outer surface regions of the yttria particles actually need be doped. This means that the core of the particle may remain substantially pure yttria.

The dopants that provide a suitable yttria-dopant composition are not limited to oxides and hydroxides of the metals listed above, but also include dopant materials that form oxides or hydroxides of such metals upon further processing. Oxides or hydroxides of the metals listed above may be of the type which are formed by further treatment, such as heating or hydration (i.e. reaction with water). For instance, carbonates of the metals may be converted into oxides or hydroxides of such metals by heating the carbonate to a temperature generally greater than the decomposition temperature of the carbonate. Many compounds also can be converted to the corresponding hydroxides of the metals by hydration. Thus, these metal compounds also can be used as dopants, as long as the subsequent processing of the doped-yttria particles results in the formation of the corresponding oxide or hydroxide, or combinations thereof, wherein the metals of the oxides or hydroxides are selected from the group consisting of aluminum, titanium, niobium, tantalum, silicon, hafnium, tin, gallium, indium, beryllium, thorium, boron, scandium, vanadium, chromium, ruthenium, rhodium, iridium, palladium, platinum, copper, germanium, bismuth, tellurium, erbium, thulium, ytterbium, lutetium, neptunium and plutonium.

With reference to particular embodiments, the present invention provides a method for forming a stabilized aqueous ceramic composition. The method first involves forming a mixture comprising yttria and at least about 0.1 weight percent of a dopant material. The dopant material is an oxide or hydroxide, or combinations thereof, or compounds that form such oxides or hydroxides upon further processing, wherein the oxides or hydroxides are of metals selected from the group consisting of aluminum, titanium, niobium, tantalum, silicon, hafnium, tin, gallium, indium, beryllium, thorium, boron, scandium, vanadium, chromium, ruthenium, rhodium, iridium, palladium, platinum, copper, germanium, bismuth, tellurium, erbium, thulium, ytterbium, lutetium, neptunium, plutonium, and combinations thereof. Without limitation, preferred metals for forming the dopants, or combinations of dopants, are selected from the group consisting of aluminum, titanium, niobium, tantalum, silicon, hafnium, tin, gallium, indium, beryllium and thorium.

Especially preferred dopants are selected from the group consisting of aluminum oxide (also referred to as alumina) and titanium dioxide (titania). This is because these materials have been commercially available for a long period of time, and also are available in various purities and particle sizes. Moreover, the isoelectric point (iep) of alumina in water is very close to that of yttria. The isoelectric point is the pH at which the surface of particle has no net positive or negative charge. As a result, the overall shape of a curve describing the surface charge versus pH and the position of the iep of alumina-doped yttria remains similar to pure yttria. Therefore, no special additional processing considerations are needed to be taken into account in substituting alumina doped yttria for pure yttria.

Without limiting the scope of this invention to one process of implementation, the mixture may be heated to a temperature sufficient to promote diffusion of the dopant into yttrium oxide, thereby providing a diffused surface layer of dopant. The required heating temperature may be different for each dopant and depends on a number of factors, such as ionic radius, surface area of the particles, and the energy of formation of the compounds. These considerations are known to those skilled in the art. Alternatively, the mixture may be heated to at least the melting temperature of the mixture. The method also may include the step of cooling the mixture after the step of heating.

Once the intimate mixture is obtained, an aqueous suspension is then formed comprising from about 1 weight percent to about 95 weight percent of the yttria-dopant composition. The yttria slurries of the present invention are useful for the formation of commercially important ceramic slurries that include compounds other than the doped-yttria particles. For instance, slurries may be made using aqueous co-solvents, particularly organic co-solvents such as, without limitation, alcohols, polyols, and ethers. The present application is directed to slurries having any such co-solvents. Moreover, additional processing materials can be added to such slurries. Examples of such compounds, without limitation, may be selected from the group consisting of co-solvents, dispersing agents, surfactants, inorganic binders, organic binders, and combinations thereof. Where a co-solvent is used, the slurry may comprise primarily an aqueous medium, or it may comprise primarily co-solvent as long as at least a minor portion of the solvent is water.

The present invention also provides a method for producing a ceramic article, such as molds for metal casting, using yttria slurries. Yttria slurries typically are used to form a thin mold facecoat, wherein the facecoat contacts the metal to be cast, such as titanium. The method involves first forming an intimate mixture comprising yttria and at least about 0.1 weight percent of a dopant material as described above. An aqueous suspension is then formed from using at least about 1 weight percent of the intimate mixture. A pattern, such as a wax pattern formed in the shape of a desired article to be cast, then is immersed into the slurry to form a mold facecoat. The pattern is withdrawn, and the excess slurry is allowed to drain from the pattern to form a uniform facecoating. This step may be repeated to add plural mold-forming layers over the pattern. The slurry-coated pattern then is removed from the slurry and coated with a fine granular stucco refractory, and the facecoat is allowed to dry. A monolithic mold is built by repeating the above steps using either the same slurry, or preferably other aqueous or non-aqueous slurries, until a sufficient material thickness is obtained. It will be appreciated that a "sufficient material thickness" depends on the end-use of the mold. Once the mold is completed, the wax pattern is removed and the mold is fired at a high temperature, such as about 2000° F. The mold thereafter is engaged with or filled with a metal to be cast, which may be a reactive metal, such as titanium, during a casting process.

The present invention also is directed to aqueous ceramic slurries comprising an intimate mixture of yttria and at least about 0.1 weight percent of the dopant material. The composition may contain any additional material that is useful for ceramic processing, including, without limitation, co-solvents, a dispersing agent, a surfactant, an inorganic binder, an organic binder, and combinations thereof.

An object of the present invention is to provide an improved stabilized yttria-containing slurry.

Still another object of the present invention is to provide a method for the formation of time-stable ceramic slurries that utilize yttria particles doped with a dopant, the dopant being an oxide or hydroxide, or combinations thereof, or materials that form such oxides or hydroxides, wherein the oxides or hydroxides are of metals selected from the group consisting of aluminum, titanium, niobium, tantalum, silicon, hafnium, tin, gallium, indium, beryllium, thorium, boron, scandium, vanadium, chromium, ruthenium, rhodium, iridium, palladium, platinum, copper, germanium, bismuth, tellurium, erbium, thulium, ytterbium, lutetium, neptunium and plutonium.

DETAILED DESCRIPTION OF THE PREFERRED EMBODIMENTS

The present invention provides a method for forming yttria slurries that are stable for a period of greater than about 48 hours, and generally greater than about a week. The method involves reducing the concentration of dissolving yttrium ions from yttrium-oxide particles over time by reducing the rate of dissolution of yttria at each pH level shown in FIG. 2. This method is highly effective in reducing the aging of yttria-based slurries.

The present invention also provides slurries comprising doped yttria particles, and cast-metal articles made using such slurries. The doped yttria particles are useful for making aqueous non-aging yttria slurries. The slurry generally comprises an aqueous suspension of a composition comprising yttrium oxide and an effective amount of a dopant, although other solvents and co-solvents also can be used to form the slurry.

A. Aqueous Ceramic Processing

A first consideration in the production of a multi-component aqueous colloidal system is to select or design each material of the system so that the particles of the different materials are compatible. Preferably, the surface charge of every ceramic particle in the aqueous system is the same. This also is true for other components of the slurry. For example, if a surfactant is added to the slurry, its surface charge should be compatible with the rest of the components. If the surface charge of the surfactant is different from that of the other particles used to form the composition, then there is an electrostatic attraction between those components having opposite surface charges. As a result, the particles agglomerate, and the slurry is destabilized.

In addition to the sign of the surface charge on each particle, the magnitude of the surface charge also is a compatibility factor. For instance, the magnitude of the surface charges associated with the components may decrease. If this decrease in surface charge continues, eventually an attraction occurs between particles having similar electrostatic signs. This results in the destabilization of the slurry.

Once colloidal particles contact water, they dissolve until the concentration of ions of the particles in the aqueous solution reaches the solubility equilibrium. The rate and extent of ion dissolution are different for each compound and are functions of a number of factors, including the pH of the suspension, the temperature, and the surface chemistry. If the rate of dissolution and the extent of dissolution of a slurry are high enough, then the ionic strength of the slurry may become so high as to effectively alter the properties of the slurry. Furthermore, if the dissolved ions are oppositely charged compared to the surface of the colloidal particles, they may preferentially adsorb on the surface and alter the properties of a slurry over time as well.

Yttria dissolves in an aqueous system to a much greater extent than other commercially important ceramics, such as alumina ($Al_2O_3$) and titania ($TiO_2$). FIG. 1 shows the dissolution of yttria species in water versus pH. The ionic yttria species may be either $Y_2(OH)_2^{4+}$, $Y(OH)^{2+}$ or $Y^{3+}$. FIG. 1 shows that for the $Y_2(OH)_2^{4+}$ and $Y(OH)^{2+}$ species, the concentration of the dissolved species increases with increasing pH, until a pH value of about 7 is reached. Thereafter, the concentration of the dissolved yttria ionic species decreases. For $Y^{3+}$, the concentration of the dissolved ionic yttria species decreases with increasing pH values.

Figure 2:
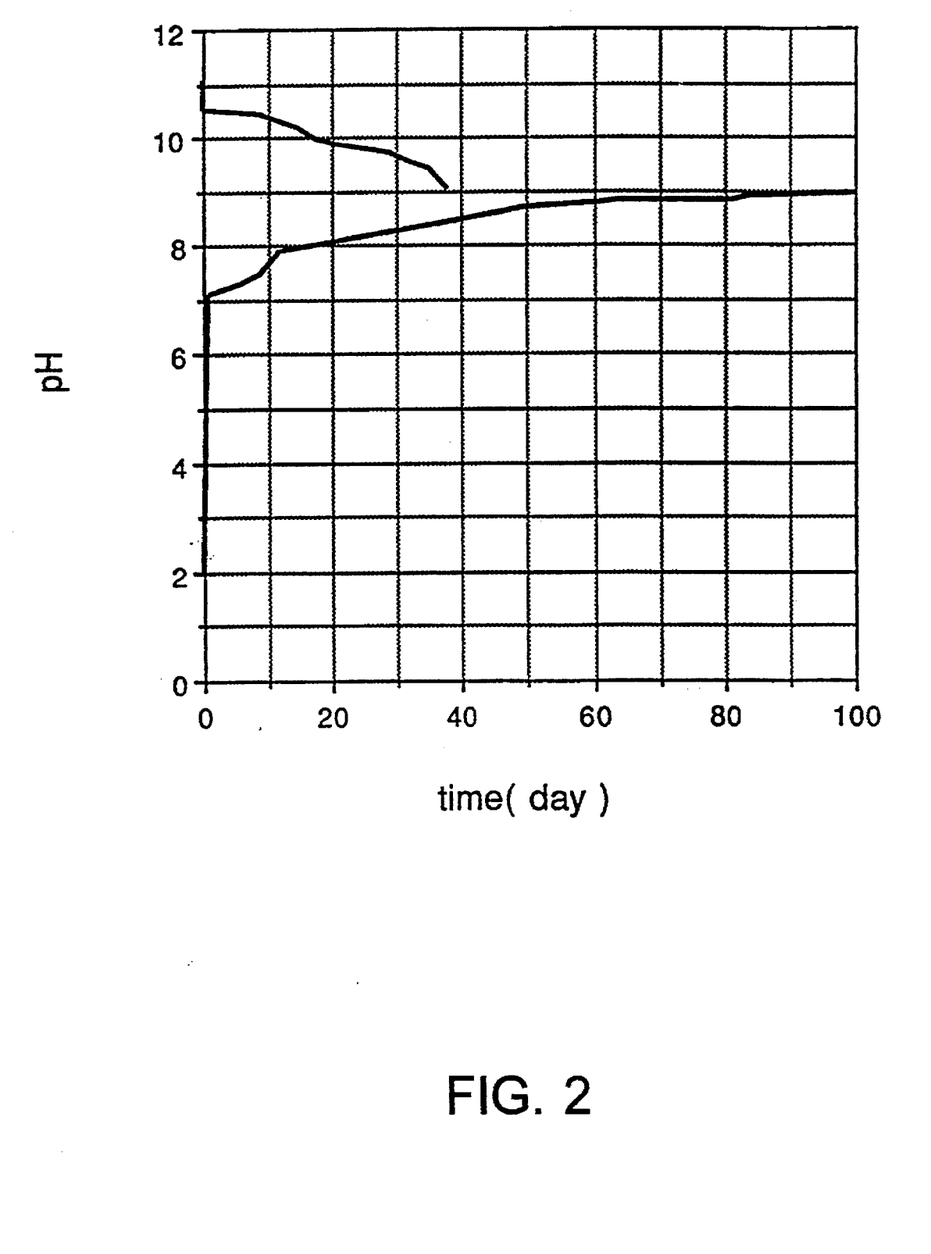
FIG. 2 is a graph showing the change in pH that occurs over time for an aqueous slurry of $Y_2O_3$ initially at a relatively low pH, and an aqueous slurry of $Y_2O_3$ initially at a relatively high pH.
Figure 3:
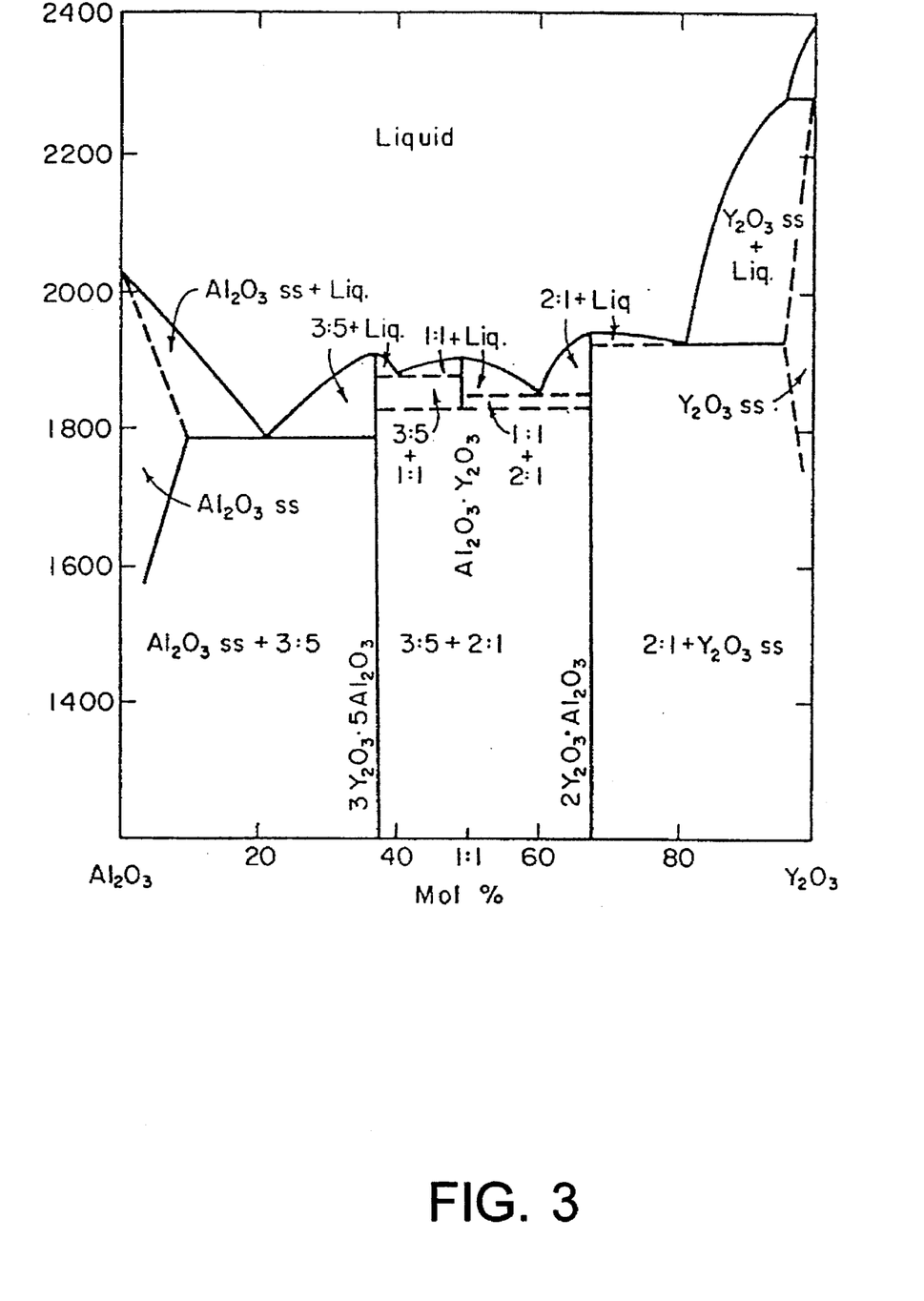
FIG. 3 is a phase diagram for $Al_2O_3$—$Y_2O_3$.

The relative rate of yttria dissolution versus pH in water is shown in FIG. 2. The slope of the curve at each pH value corresponds to the rate of dissolution of yttria at that pH. FIG. 2 shows that the dissolution rate of yttria is quite rapid regardless of whether the initial pH is acidic or basic. For purposes of comparison, the dissolution rate of yttria at pH 4 is about 5 orders of magnitude greater than the dissolution rate of alumina. FIG. 2 therefore illustrates the problem encountered when aqueous yttria processing is attempted; yttria's dissolution rate is so great that ceramic processing is difficult even after only a short period of time has elapsed following formation of the ceramic slurry. As time continues to pass following the formation of a yttria slurry, the slurry continues to destabilize as a result of the increasing concentration of aqueous ionic yttria species.

At pH values less than about 8.5, the surfaces of the yttria particles are positively charged. Within this pH range, yttria particles dissolve to such an extent that yttria slurries may destabilize after only a brief period of time. This is because the suspensions have a very high ionic strength as a result of yttria particle dissolution. At basic pH values, i.e. pH values greater than about 8.5, the surfaces of typical materials used in ceramic slurries are negative. However, dissolved yttrium ions are positively charged throughout the entire pH range. As a result, dissolving ions from yttria preferentially adsorb on the surface of the negatively charged particles and other constituents. Over time, this adsorption process also disfavorably alters the properties of yttria slurries.

The following paragraphs discuss how to make and use compositions according to the present invention.

B. Stabilizing Dopants for Yttria Powders

Because the present invention involves forming an aqueous suspension from an intimate mixture of yttria and a dopant, a primary consideration for practicing the present invention is the selection of the dopant. Preferred dopants are selected so that they (1) have a lower aqueous solubility than yttria, and/or (2) have a slower dissolution rate than yttria at the particular pH value of interest, and/or (3) produce ionic species upon dissolution that are predominantly negatively charged. Yttria powders made according to the present invention do not allow positive yttrium ions to dissolve or adsorb onto suspension components in aqueous solutions at the same rates as undoped yttria. This hindrance of dissolution rate produces more stable yttria slurries that are suitable for production environments.

It is believed that the dissolution rate of any ceramic in an aqueous system is related to the change in the number of hydroxyl ions in solution. This change in the number of hydroxyl groups is caused by the amount of material dissolved per surface area of the crystal per unit time. If the pH of a ceramic suspension is below the equilibrium pH of the ceramic material in that specific aqueous environment (the equilibrium pH is that pH where equal numbers of hydroxyl groups are produced as are assimilated by the ceramic particles), then the ceramic particles dissolve in such a way as to increase the number of hydroxyl ions in solution to reach the equilibrium pH. On the other hand, if the pH of the ceramic suspension is above the equilibrium pH, then the ceramic particles dissolve in such a way as to decrease the number of hydroxyl ions in solution to reach the equilibrium pH. FIG. 2 illustrates the above for yttria where the pH of the solution is plotted versus time per unit surface area.

Without limiting the present invention to one theory of operation, it appears that dopants suitable for the present invention occupy or "pin down" dissolution sites on the surface of the yttria particles, and thereby reduce the dissolution rate of the yttria particles. This in turn stabilizes the slurry. Currently, there are two possible explanations for why the slurry is stabilized, depending upon whether the dopant is within the solid solution limit in yttria or not.

The first explanation depends on whether the dopant makes a ternary oxide with yttria (i.e., $Y_xM_yO_z$, where M represents the dopant cation), or whether the concentration of the dopant is within the solid solution limit in yttria [a "solid solution" refers to a uniformly dispersed mixture, at the molecular or ionic level, of one or more substances (the solute, which in this case is the dopant) in one or more other substances (the solvent, which in this case is yttria)]. In such cases, the dopant may cause each metal-oxygen bond at the oxide surface to exhibit an average reactivity with water. In the present case, incorporation of M into $Y_2O_3$ would alter the strength and water reactivity of the yttrium and oxygen bonds. An alternative interpretation is to assume no averaging of reactivity among cations. However, pathways for dissolution have sequential character. As a result, each bond linking a yttrium metal to the lattice structure must break before yttrium is released. The M-O bonds at the surface of yttrium-oxide particles are stronger, and therefore more resistant to cleavage than Y-O bonds. As a result, the overall rate of yttria dissolution decreases.

If the concentration of the dopant is outside the solid solution limit in yttria, and it makes no ternary oxide with yttria, then the dopant likely forms thin layers on at least certain portions of the yttria surface. This protects Y-O bonds from coming in contact with water. On the other hand, if the dopant makes a ternary oxide with yttria, then it will modify the strength of the yttria-oxygen bonds, and the above explanation again holds true. Because the dissolution of yttrium-oxide particles appears to be primarily a surface reaction, in the absence of any particle breakage only a minor portion of the outer surface of the yttria particles need be doped. The dopant layer provides a protective coating on the surface of the yttria particles, thereby reducing the rate of dissolution of such particles. This means that the core of the yttria particles remains substantially pure yttria, and thus the "surfaced-doped" yttria particles of the present application may be used in applications where higher purity yttria is needed.

FIG. 3 is a phase diagram for $Al_2O_3$—$Y_2O_3$. It illustrates the formation of a solid solution between alumina and yttria. If the yttria-dopant composition is formed by fusing alumina with yttria in a molten state, then FIG. 3 shows that below the melting point, 4.3 mole percent alumina will remain in solid solution with yttria. As the mixture cools down, the solid-solution range decreases until at room temperature it narrows to less than 1 mole percent. If the dopant level is below 1 mole percent, then the dopant will remain in solid solution with yttria at room temperature. However, if it is above 1 mole percent, it may or may not remain in solid solution, depending on how rapidly the mixture is cooled. If the mixture is cooled rapidly, most of the dopant likely will remain in solid solution because the dopant does not have enough time to migrate out of the yttria lattice. However, if the mixture is cooled slowly, most of the excess dopant will come out of solid solution with yttria and form a ternary oxide of $2Y_2O_3$—$Al_2O_3$. Alumina retards yttria dissolution regardless of whether it is in the solid-solution limit or not. For dopants other than alumina, appropriate phase diagrams should be consulted for details of the microstructure of doped yttria particles. These considerations are known to those skilled in the art.

The effectiveness of the dopant seems to be related to its concentration. This appears to be intuitively justifiable. As the amount of dopant increases, the surfaces of the yttria particles become more dopant-like. The present invention requires that an "effective amount" of a dopant be used to form the yttria-dopant intimate mixture. As used herein, an "effective amount" of a dopant is an amount of the dopant sufficient to stabilize the yttria slurry versus time. More specifically, a sufficient amount of the dopant should be used to stabilize the yttria slurry for a period of time of greater than about 48 hours, and preferably for a period of at least about one week.

One skilled in the art will realize that the concentration of a certain dopant needed to provide this stabilization may vary. However, without limitation and simply to provide the best-known lower concentration of the dopant that appears to provide a working invention, the lower amount of the dopant apparently is at least about 0.1 weight percent, based on the initial weight of the ceramic particle. The maximum concentration may be as high as desired, as long as the particle still functions as a useful ceramic particle. In other words, the intimate ceramic-dopant mixture must include an amount of the dopant effective to stabilize the ceramic suspension, but not such a high dopant concentration that the particle is inoperative as a ceramic material. Although this maximum amount of dopant may vary, it currently is believed that a reasonable upper concentration of the dopant is about 95 weight percent. Thus, the dopant concentration may vary from at least about 0.1 weight percent to about 95 weight percent, and more typically from at least about 0.1 weight percent to about 50 weight percent, and preferably from at least about 0.1 weight percent to about 20 weight percent. If only a surface layer is doped, then the dopant concentration is at least about 0.1 weight percent with respect to the diffused layer only.

Thus, based on the preceding paragraphs, any material that can stabilize aqueous yttria slurries, and which does not interfere with subsequent processing of the ceramic slurry, theoretically is a possible candidate for use as a dopant. There are, however, additional criteria that can be considered for the selection of a suitable dopant. For instance, if a sintering agent, such as titania or vanadium pentoxide, is to be incorporated into the ceramic product produced from the ceramic slurry, then an efficient process comprises including titania or vanadium pentoxide as the yttria dopant. This would accomplish two tasks: (1) it would stabilize the yttria slurry from prematurely aging over time; and (2) it would incorporate a needed component into the slurry. Certain industrially important ceramic materials can be used as dopants for yttria. For example, in a yttria-alumina binary system at pH 9.5, the slurry may age in a few days. However, aging of the same system can be prevented if yttria is doped with about 5 weight percent alumina. Although the first system is a binary system and the second system comprises an intimate mixture of the dopant and yttria, the relative amounts and the constituents of the slurry do not change.

The same concept may be applied successfully to other industrially important slurry systems in which yttria is one of the components. By doping yttria with one of the other existing components in the slurry, wherein such existing slurry component is identified as a dopant based on the guidelines of the present invention, the dissolution rate of yttria may be reduced in the slurry.

Figure 4:
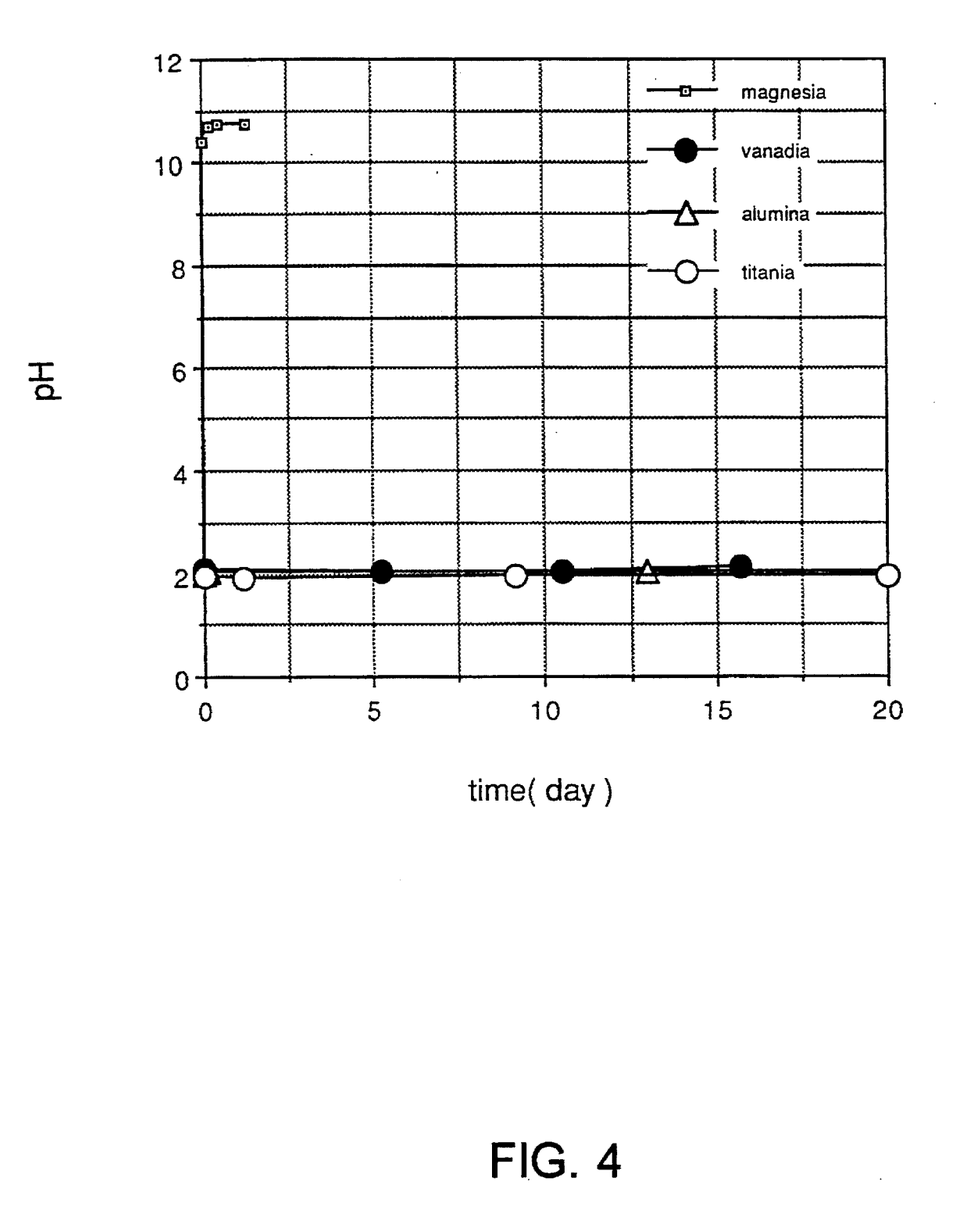
FIG. 4 is a graph showing the change in pH that occurs over time for aqueous slurries of MgO, $V_2O_5$, $Al_2O_3$ and $TiO_2$.
Figure 5:
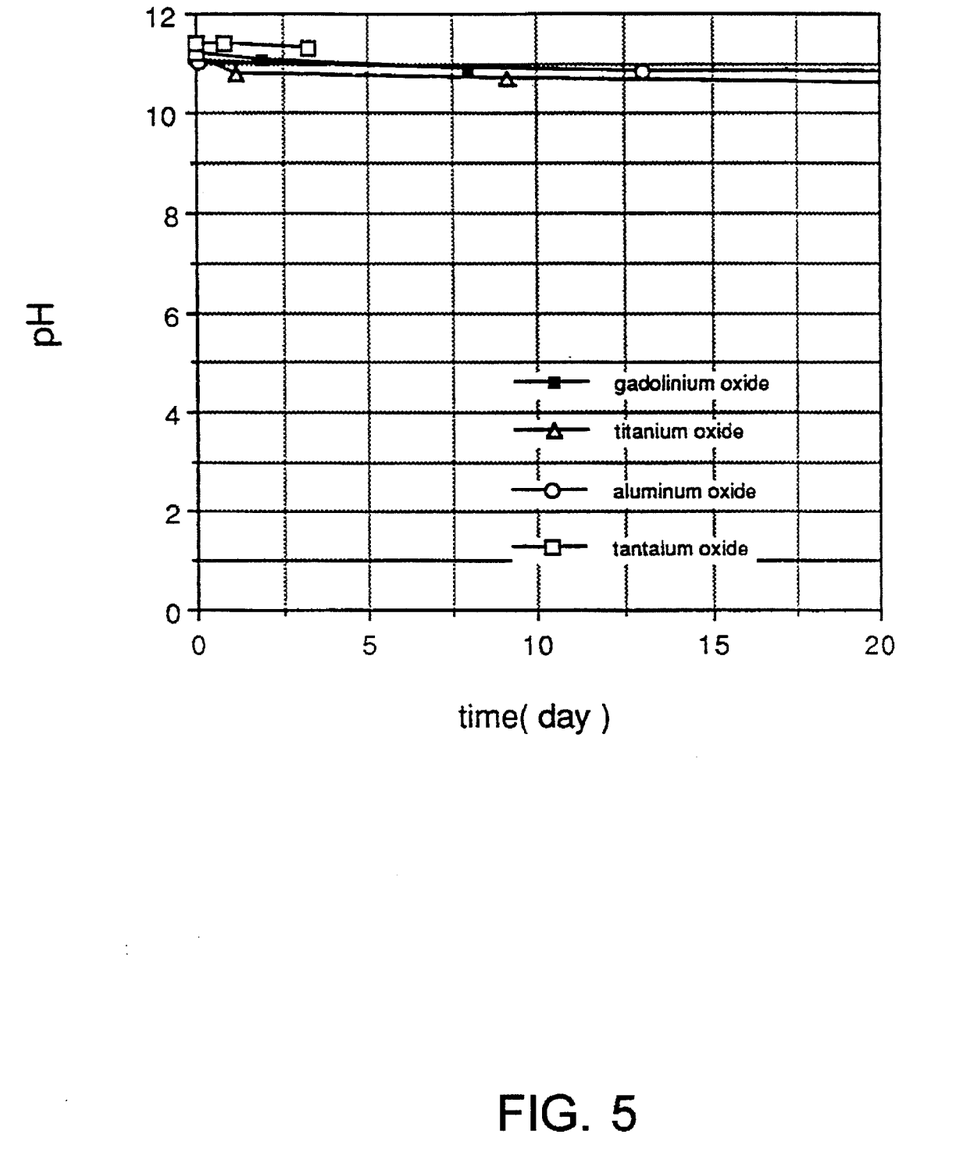
FIG. 5 is a graph showing the change in pH that occurs over time for aqueous slurries of $Gd_2O_3$, $TiO_2$, $Al_2O_3$ and $Ta_2O_3$.

FIGS. 4 and 5 illustrate dissolution rates of different metal oxides at below and above the equilibrium pH of yttrium oxide. Certain alkali and alkaline-earth metal oxides, such as magnesium oxide (see FIG. 4) and calcium oxide, have solubility rates greater than that of yttria. As a result, metal oxides of the alkali and alkaline-earth metals generally are not suitable dopants for the present invention.

More specifically, metals that are useful for forming candidate oxide- or hydroxide-dopant materials, or combinations of oxide- or hydroxide-dopant materials, for stabilizing yttrium-oxide slurries are selected from the group consisting of aluminum, titanium, niobium, tantalum, silicon, hafnium, tin, gallium, indium, beryllium, thorium, boron, scandium, vanadium, chromium, ruthenium, rhodium, iridium, palladium, platinum, copper, germanium, bismuth, tellurium, erbium, thulium, ytterbium, lutetium, neptunium, plutonium and combinations thereof. Preferably, the metal is selected from the group consisting of aluminum, titanium, niobium, tantalum, silicon, hafnium, tin, gallium, indium, beryllium, thorium and combinations thereof. Currently, especially preferred metals are selected from the group consisting of aluminum, titanium and combinations thereof. These metals form stable metal-to-oxygen bonds that can stabilize yttria in an aqueous media once they are incorporated into the solid-state structure of yttrium oxide.

Although certain metal oxides and/or metal hydroxides, and combinations thereof, are useful for forming dopant compositions as discussed above, other materials also are useful for forming dopants. These materials typically form metal oxides and/or metal hydroxides upon further processing, such as hydration or heating. Thus, compounds that can be treated to form an oxide and/or hydroxide of the metals listed above also may be used as a dopant for the present invention. This also includes the formation of an oxide from a hydroxide, or vice versa.

Many of the oxides or hydroxides of the metals identified herein as useful for forming dopants can be obtained by heating a suitable precursor. What constitutes a suitable precursor and temperature for heating such compositions must be determined on a composition-by-composition basis. For instance, heating a carbonate of the metals disclosed herein often yields metal oxides upon strong heating in air. Solely to provide a guideline, it currently is believed that compositions should be heated to a temperature of about 1,000° C.

As another example, titanium dioxide may be formed by the hydrolysis of titanium (IV) sulfate. Thus, titanium (IV) sulfate also can function as a dopant, as long as it is further processed through hydrolysis to form titanium-oxygen bonds in such a manner as to provide a suitably doped yttria-titanium composition.

Doped yttria powders suitable for the present invention may be prepared by any method known to those skilled in the art. For instance, an intimate mixture of yttria and the dopant may be produced by heating a mixture of the dopant and yttria to a temperature sufficient to calcine the mixture (calcining). The required calcining temperature may be different for each dopant and depends on a number of factors, such as ionic radius, surface area of the particles, and the energy of formation of the compounds. The method also may include the step of cooling the mixture after the step of heating.

The heating step is one method, but not the only method, of forming an intimately mixed yttria-dopant composition. "Intimately mixed" or "intimate mixture" is used to differentiate binary mixtures that result simply from the physical combination of two components. Typically, an "intimate mixture" means that the dopant material is atomically dispersed in yttria, such as with a solid solution or as small precipitates in the crystal matrix of the solid yttrium oxide. Alternatively, an intimate mixture may refer to compounds that are fused. The fused material also may be synthesized by first forming a desired weight mixture of a source of a dopant, such as alumina, and a source of yttria, such as yttrium oxide. This mixture is heated until molten, such as up to about 2000° C., and then cooled to produce the fused flour. The fused material is crushed into small particles having a desired particle size, such as particle sizes of from about 10 μm to about 15 μm.

An intimate mixture of the yttria particles and the dopant also includes having the dopant provided in an amount sufficient to form a monolayer coating on the surface of the yttria particles. Because hydration and dissolution appear to be primarily surface reactions, the use of dopant to act as a surface coating also helps stabilize such ceramic particles from dissolution and hydration.

Hence, methods for the formation of intimate mixture include, but are not limited to: (1) melt fusion (heating yttria and the dopant to a temperature above the melting point of the mixture); (2) solid-state calcination (calcination refers to the process whereby a solid material is heated to a temperature below its melting point to bring about a state of thermal decomposition or a phase transition other than melting); (3) co-precipitation followed by calcination; and (4) any surface diffusion method by which the dopant can be diffused some distance into the outer surface regions of the yttria particles. Furthermore, the dopant may be in solid solution with yttria, or it may be in the form of small precipitates in the crystal matrix of the solid yttrium oxide.

Aqueous yttria suspensions have been made by combining substantially pure yttria, such as about 10 grams of 99.99% pure yttria (which was obtained from Rhone-Poulenc), with deionized water, such as about 100 cc of deionized water. In a similar manner, yttria-dopant slurries have been made by substituting yttria-dopant compositions for pure yttria. As the concentration of the dopant increases, the dissolution rate of yttria generally decreases. That is, there appears to be an inverse relationship between the amount of dopant used and the stabilization achieved by the doped compositions.

The viscosities of slurries made with pure yttria and with doped yttria also have been compared (See Examples 1 and 2). The viscosity of a slurry is an indicator of whether the slurry is stable. In general, it is undesirable to have the viscosity of a slurry significantly change with time. In other words, increased viscosity is associated with decreased slurry stability.

EXAMPLES

The present invention will be more fully illustrated by considering the following examples. These examples should not be construed to limit the scope of the invention to the particular embodiments described.

Example 1

This example describes how the viscosity of a yttria-containing slurry can be maintained stable over time if the yttria particles first are doped with alumina. Substantially pure (99.99%) yttria was obtained from Rhone-Poulenc. A fused yttria-alumina powder (95 weight percent yttria and 5 percent alumina) was specially ordered from the Treibacher Company. An aqueous yttria slurry was made by combining 848 grams of the substantially pure yttria with 51 cc of deionized water. 848 grams of the fused yttria-alumina powder also were added to 51 cc of deionized water with stirring using a high-shear mixer at 3000 rpm. Thereafter, about 20 grams of latex (Dow 460 NA), about 2 grams of surfactant (Aerosol OT), about 1 gram of antifoaming agent (Dow Corning 65 Additive) and about 80 grams of colloidal silica (Ludox SM, Du Pont) were added to each of the slurries with continued mixing. The pH of the resultant slurry was about 9.5. Thereafter, the change in the viscosity of the yttria-alumina slurry was measured over time.

Figure 6:
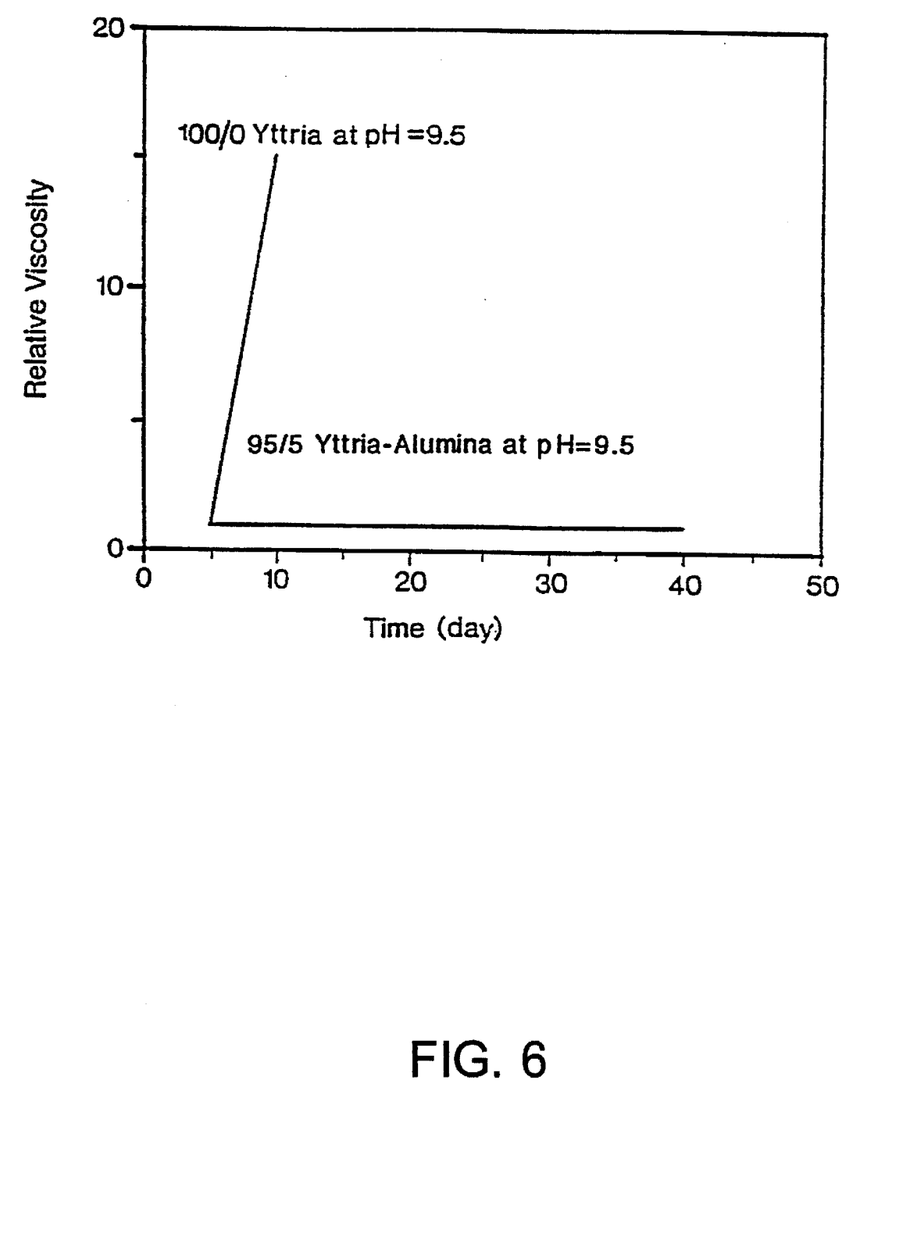
FIG. 6 is a graph showing the change in relative viscosity that occurs over time for a pure yttria slurry, and a slurry made using yttria doped with 5 weight percent alumina.

The change in relative viscosity over time for a pure yttria slurry, and for a slurry made using yttria doped with 5 weight percent alumina, are shown in FIG. 6. FIG. 6 shows that the viscosity of a pure yttria slurry increased dramatically over a period of less than about a week. In fact, the pure yttria slurry had at least a 15-fold increase in its relative viscosity in less than 10 days (from a relative value of about 1 to about 15). The relative viscosities for slurries made with fused flours are significantly lower than with the pure yttria slurry. Slurries made with the doped yttria particles maintained a relative viscosity value of about 1, even after a period of about 40 days. Slurries made with the doped yttria particles of the present invention therefore form a yttria slurry that exhibits significant stability enhancement relative to slurries made with pure yttria.

Example 2

This example also illustrates the change in viscosity of a yttria-alumina binary suspension versus time wherein the alumina and yttria particles have been stabilized with PMAA-Na. This example further shows how slurry aging can be suppressed if yttria is doped with alumina.

Particles were stabilized with a polyelectrolyte dispersing agent by coating the yttria particles with a monolayer of the dispersing agent. The suspension was prepared as follows. First, 0.5 weight percent (based on dry weight of powder) of the sodium salt of polymethacrylic acid (PMAA-Na) was mixed with deionized water. To this solution was then added 40 volume percent 99.99% pure alumina (Sumitomo Co.) with an average diameter of 0.2 μm, and 5% yttria or 5% yttria doped with 5% alumina. The suspension pH was then adjusted to 8 using HCl. Following the pH adjustment, the suspension was ultrasonicated for 100 seconds in order to break up particle agglomerates and enhance adsorption of PMAA to the surface of particle. In order to prevent an increase in the temperature of the suspension, ultrasonication was performed in an ice bath. The ultrasonicator used was a VIBRA CELL from Sonics & Materials Inc., and the power output was adjusted to 40%. The viscosity of the slurries was then measured over time.

Figure 7:
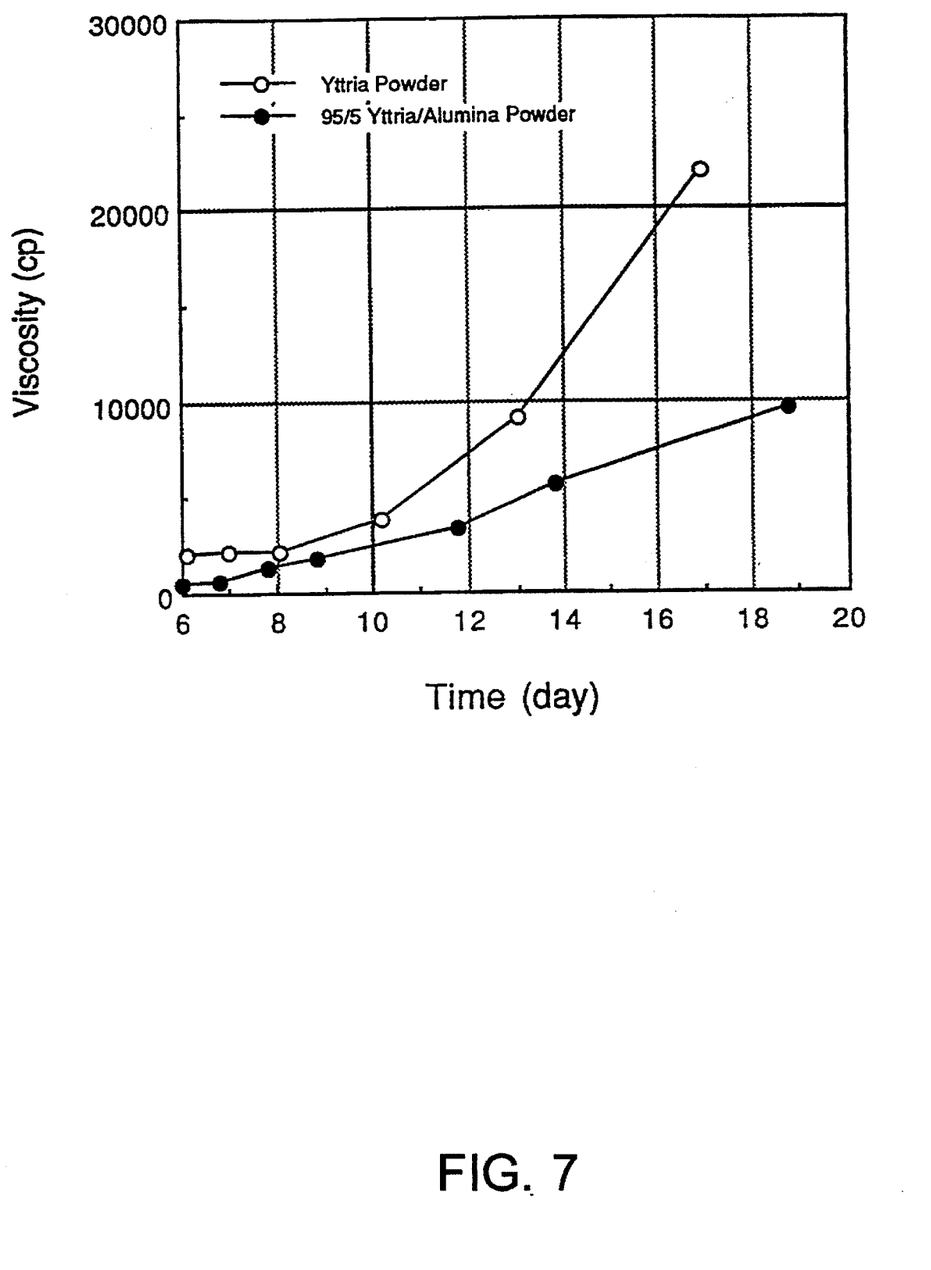
FIG. 7 is a graph showing the change in viscosity that occurs over time for slurries made from substantially pure yttria, and slurries made from yttria doped with 5 weight percent alumina.

FIG. 7 shows that the viscosity of the slurry formed using 95 weight percent yttria/5 weight percent alumina changed very slowly. This change is much less rapid than the change in viscosity exhibited by the slurry with pure yttria particles, which indicates that the yttrium ions dissolve to a lesser extent when fused yttria-alumina particles are used.

The present invention is particularly directed to aqueous slurries that are useful for ceramic processing. However, additional slurry solvents and co-solvents can be used to form useful slurries. The following Example 3 is directed to the formation of an aqueous ceramic slurry that contains the doped yttria materials of the present invention and organic co-solvents. As used herein, "organic co-solvents" and similar phrases refer to any organic compound that is at least partially miscible with water.

Example 3

A ceramic processing composition could be made by combining ethyl silicate (Union Carbide, 18.59 weight percent), ethyl alcohol (190, 37.18 weight percent), glycol ether EP (25.49 weight percent), glycol ether PM (17 weight percent), HCl (30% assay, 0.52 weight percent) and deionized water (1.23 weight percent). To 16.5 grams of this mixture would be added about 70 grams of an intimate mixture comprising yttria and at least about 0.1 weight percent of a dopant material comprising an oxide or hydroxide, or combinations thereof, or compounds that form such oxides or hydroxides upon further processing, wherein the oxides or hydroxides are of metals selected from the group consisting of aluminum, titanium, niobium, tantalum, silicon, hafnium, tin, gallium, indium, beryllium, thorium, boron, scandium, vanadium, chromium, ruthenium, rhodium, iridium, palladium, platinum, copper, germanium, bismuth, tellurium, erbium, thulium, ytterbium, lutetium, neptunium, plutonium, and combinations thereof. The measured pH value of a slurry made using yttria powder alone raises quickly to about 5.5, as a result of yttria dissolution. These higher pH values catalyze the polymerization of ethyl silicate, which causes the slurry to gel. However, a slurry made using an intimate mixture of yttria and a dopant according to the present invention would have a more stable pH, and slower slurry gelling likely would be observed relative to pure yttria powders. Thus, ceramic slurries can be made using the intimately mixed yttria-dopant materials of the present invention and organic materials including, without limitation, ethers, alcohols, polyols, and combinations thereof, particularly lower (i.e., 22 carbon chains having 1 to about 10 carbon atoms) alkyl ethers, alcohols, polyols and combinations thereof.

The present invention has been described with reference to several preferred embodiments. Other embodiments of the invention will be apparent to those skilled in the art from a consideration of this specification or practice of the invention disclosed herein. It is intended that the specification and examples contained herein be considered as exemplary only, with the true scope and spirit of the invention being indicated by the following claims.

We claim:

1. A method for stabilizing an aqueous yttria-containing slurry by means of a yttria-stabilizing dopant, comprising the steps of:

forming an intimate yttria-dopant mixture comprising yttria and from about 0.1 weight percent to about 95 weight percent of a dopant material comprising an oxide or hydroxide, or combinations thereof, or compounds that form such oxides or hydroxides upon further processing, wherein the oxides or hydroxides are of metals selected from the group consisting of aluminum, titanium, tantalum, silicon, hafnium, tin, gallium, indium, beryllium, thorium, boron, scandium, ruthenium, rhodium, iridium, palladium, platinum, copper, germanium, bismuth, tellurium, erbium, thulium, ytterbium, lutetium, neptunium, plutonium, and combinations thereof; and forming an aqueous slurry comprising from about 1 weight percent to about 95 weight percent of the yttria-dopant mixture.

2. The method according to claim 1 wherein the step of forming an intimate mixture comprises heating a mixture of yttria and the dopant material.

3. The method according to claim 2 and including the step of cooling the mixture after the step of heating.

4. The method according to claim 2 wherein the step of heating comprises heating the mixture to a temperature sufficient to calcine the mixture.

5. The method according to claim 2 wherein the step of heating comprises heating the mixture to a temperature sufficient to fuse yttria and the dopant.

6. The method according to claim 2 wherein the step of heating comprises heating the mixture to a temperature of at least about 1,000° C.

7. The method according to claim 1 wherein from about 0.1 weight percent to about 20 weight percent of the dopant is used to form the intimate mixture.

8. The method according to claim 1 wherein the metal used to form the dopant is selected from the group consisting of aluminum, titanium, tantalum, silicon, hafnium, tin, gallium, indium, beryllium, thorium and combinations thereof.

9. The method according to claim 1 wherein the dopant is selected from the group consisting of aluminum oxide, titanium dioxide, and combinations thereof.

10. The method according to claim 1 wherein the dopant is aluminum oxide.

11. The method according to claim 1 wherein the dopant is titanium dioxide.

12. The method according to claim 1 wherein the aqueous slurry further comprises a compound selected from the group consisting of co-solvents, dispersing agents, surfactants, inorganic binders, organic binders, and combinations thereof.

13. The method according to claim 1 wherein the yttria-dopant mixture comprises fused yttria-alumina.

14. A method for stabilizing an aqueous yttria-containing slurry by means of a yttria-stabilizing dopant, comprising the steps of:

forming an intimate yttria-dopant mixture comprising yttria and from about 0.1 weight percent to about 95 weight percent of a dopant material wherein the dopant forms a coating on portions of the outer surface of the yttria particles, the dopant material comprising an oxide or hydroxide, or combinations thereof, or compounds that form such oxides or hydroxides upon further processing, wherein the oxides or hydroxides are of metals selected from the group consisting of aluminum, titanium, niobium, tantalum, silicon, hafnium, tin, gallium, indium, beryllium, thorium, boron, scandium, vanadium, chromium, ruthenium, rhodium, iridium, palladium, platinum, copper, germanium, bismuth, tellurium, erbium, thulium, ytterbium, lutetium, neptunium, plutonium, and combinations thereof; and forming an aqueous slurry comprising from about 1 weight percent to about 95 weight percent of the yttria-dopant mixture.

15. A method for stabilizing an aqueous yttria-containing slurry by means of a yttria-stabilizing dopant, comprising the steps of:

forming an intimate yttria-dopant mixture comprising yttria and from about 0.1 weight percent to about 95 weight percent of a dopant material, wherein the dopant diffuses into the outer surface of the yttria particles, thereby forming yttria particles having a diffused surface layer of dopant, the dopant material comprising an oxide or hydroxide, or combinations thereof, or compounds that form such oxides or hydroxides upon further processing, wherein the oxides or hydroxides are of metals selected from the group consisting of aluminum, titanium, niobium, tantalum, silicon, hafnium, tin, gallium, indium, beryllium, thorium, boron, scandium, vanadium, chromium, ruthenium, rhodium, iridium, palladium, platinum, copper, germanium, bismuth, tellurium, erbium, thulium, ytterbium, lutetium, neptunium, plutonium, and combinations thereof; and forming an aqueous slurry comprising from about 1 weight percent to about 95 weight percent of the yttria-dopant mixture.

16. A method for stabilizing an aqueous yttria-containing slurry by means of a yttria-stabilizing dopant, comprising the steps of:

forming a yttria-dopant mixture comprising yttria and from about 0.1 weight percent to about 95 weight percent of a dopant material, the dopant material comprising an oxide or hydroxide, or combinations thereof, or compounds that form oxides or hydroxides upon further processing, wherein the oxides or hydroxides are of metals selected from the group consisting of aluminum, titanium, tantalum, silicon, hafnium, tin, gallium, indium, beryllium, thorium, boron, scandium, ruthenium, rhodium, iridium, palladium, platinum, copper, germanium, bismuth, tellurium, erbium, thulium, ytterbium, lutetium, neptunium, plutonium and combinations thereof;

heating the mixture to a temperature sufficient to at least calcine the mixture, thereby forming an intimate yttria-dopant composition; and forming an aqueous suspension comprising at least about 1 weight percent to about 95 weight percent of the intimate yttria-dopant composition following the step of heating.

17. The method according to claim 16 and including the step of cooling the composition following the step of heating.

18. The method according to claim 16 wherein the dopant is selected from the group consisting of aluminum, titanium, tantalum, silicon, hafnium, tin, gallium, indium, beryllium, thorium and combinations thereof.

19. The method according to claim 16 wherein the dopant is aluminium oxide.

20. The method according to claim 16 wherein the dopant is titanium dioxide.

21. The method according to claim 16 wherein the aqueous slurry further comprises a compound selected from the group consisting of co-solvents, dispersing agents, surfactants, inorganic binders, organic binders, and combinations thereof.

22. A method for stabilizing an aqueous ceramic yttria slurry by means of a yttria-stabilizing dopant, comprising the steps of:

forming a composition comprising yttria particles having a surface coating of from about 0.1 weight percent to about 95 weight percent of a dopant material, the dopant material comprising an oxide or hydroxide, or compounds that form oxides or hydroxides upon further processing, or combinations thereof, wherein the oxides or hydroxides are of metals selected from the group consisting of aluminum, titanium, tantalum, silicon, hafnium, tin, gallium, indium, beryllium, thorium, boron, scandium, ruthenium, rhodium, iridium, palladium, platinum, copper, germanium, bismuth, tellurium, erbium, thulium, ytterbium, lutetium, neptunium and plutonium; and forming an aqueous suspension comprising from about 1 weight percent to about 95 weight percent of the composition.

23. The method according to claim 22 wherein the dopant is selected from the group consisting of aluminum oxide, titanium dioxide, tantalum pentoxide, silicon dioxide and combinations thereof.

24. The method according to claim 22 wherein the dopant is aluminum oxide.

25. The method according to claim 22 wherein the dopant is titanium dioxide.

26. A method for casting a metal article, comprising;

forming an intimate yttria-dopant mixture comprising yttria and from about 0.1 weight percent to about 95 weight percent of a dopant material, the dopant material comprising an oxide or hydroxide, or compounds that form oxides or hydroxides upon further processing, or combinations thereof, wherein the oxides or hydroxides are of metals selected from the group consisting of titanium, tantalum, silicon, hafnium, tin, gallium, indium, beryllium, thorium, boron, scandium, ruthenium, rhodium, iridium, palladium, platinum, copper, germanium, bismuth, tellurium, erbium, thulium, ytterbium, lutetium, neptunium, plutonium, and combinations thereof;

heating the mixture to a temperature sufficient to at least calcine the mixture, thereby forming a yttria-dopant composition;

forming a aqueous suspension of the yttria-dopant composition comprising at least about 1 weight percent of the yttria-dopant composition;

providing a pattern in the shape of an article to be cast;

applying the suspension to the pattern to form a mold facecoat;

adding plural mold forming layers over the pattern to form a mold;

removing the pattern; and casting a metal article using the mold with the facecoat.

27. The method according to claim 26 wherein the dopant material is selected from the group consisting of titanium, niobium, tantalum, silicon, hafnium, tin, gallium, indium, beryllium, thorium and combinations thereof.

28. The method according to claim 26 wherein the step of heating the mixture comprises heating the mixture to a temperature sufficient to fuse the mixture.

29. The method according to claim 26 wherein the liquid suspension further comprises a compound selected from the group consisting of co-solvents, dispersing agents, surfactants, inorganic binders, organic binders, and combinations thereof.

30. An aqueous ceramic slurry comprising an intimate yttria-dopant mixture comprising from about 0.1 weight percent to about 95 weight percent of a dopant material, the dopant material comprising an oxide or hydroxide, or combinations thereof, or compounds that form such oxides or hydroxides upon further processing, wherein the oxides or hydroxides are of metals selected from the group consisting of titanium, tantalum, silicon, hafnium, tin, gallium, indium, beryllium, thorium, boron, scandium, ruthenium, rhodium, iridium, palladium, platinum, copper, germanium, bismuth, tellurium, erbium, thulium, ytterbium, lutetium, neptunium, plutonium and combinations thereof.

31. The composition according to claim 30 wherein the oxides or hydroxides of the dopant are of metals selected from the group consisting of titanium, niobium, tantalum, silicon, hafnium, tin, gallium, indium, beryllium, thorium and combinations thereof.

32. The composition according to claim 30 wherein the yttria-dopant mixture comprises fused yttria-titania.

33. The slurry according to claim 30 and further comprising a compound selected from the group consisting of co-solvents, dispersing agents, surfactants, inorganic binders, organic binders, and combinations thereof.

34. A method for stabilizing an aqueous yttria-containing slurry by means of a yttria-stabilizing dopant, comprising:

fusing yttria with from about 0.1 weight percent to about 95 weight percent of a dopant material comprising an oxide or hydroxide, or combinations thereof, or compounds that form such oxides or hydroxides upon further processing, wherein the oxides or hydroxides are of metals selected from the group consisting of aluminum oxide, titanium dioxide, and combinations thereof; and forming an aqueous slurry comprising from about 1 weight percent to about 95 weight percent of the yttria-dopant mixture.

35. A method for casting a metal article, comprising;

forming an intimate yttria-dopant mixture by fusing yttria with from about 0.1 weight percent to about 95 weight percent of a dopant comprising an oxide or hydroxide, or compounds that form oxides or hydroxides upon further processing, or combinations thereof, wherein the oxides or hydroxides are of metals selected from the group consisting of titanium, niobium, tantalum, silicon, hafnium, tin, gallium, indium, beryllium, thorium, boron, scandium, vanadium, chromium, ruthenium, rhodium, iridium, palladium, platinum, copper, germanium, bismuth, tellurium, erbium, thulium, ytterbium, lutetium, neptunium, plutonium, and combinations thereof;

forming an aqueous suspension of the yttria-dopant composition comprising at least about 1 weight percent of the yttria-dopant composition;

providing a pattern in the shape of an article to be cast;

applying the suspension to the pattern to form a mold facecoat;

adding plural mold forming layers over the pattern to form a mold;

removing the pattern; and casting a metal article using the mold with the facecoat.

36. A method for casting a metal article, comprising;

forming an intimate yttria-dopant composition comprising yttria and at least 5 weight percent of titania;

forming a liquid suspension of the yttria-dopant composition comprising at least about 1 weight percent of the yttria-dopant composition;

providing a pattern in the shape of an article to be cast;

applying the suspension to the pattern to form a mold facecoat;

adding plural mold forming layers over the pattern to form a mold;

removing the pattern; and casting a metal article using the mold with the facecoat.

37. The method according to claim 36 wherein the step of forming an intimate mixture comprises fusing yttria with the dopant.

38. A method for stabilizing an aqueous yttria-containing slurry by means of a yttria-stabilizing dopant, comprising the steps of:

forming an intimate mixture comprising yttria and at least about 5 weight percent of a dopant material comprising an oxide or hydroxide, or combinations thereof, or compounds that form such oxides or hydroxides upon further processing, wherein the oxides or hydroxides are of metals selected from the group consisting of tantalum, silicon, hafnium, tin, gallium, indium, beryllium, thorium, boron, scandium, ruthenium, rhodium, iridium, palladium, platinum, copper, germanium, bismuth, tellurium, erbium, thulium, ytterbium, lutetium, neptunium, plutonium, and combinations thereof; and forming an aqueous slurry comprising the yttria-dopant mixture.

39. A method for stabilizing an aqueous yttria-containing slurry by means of a yttria-stabilizing dopant, comprising the steps of:

forming an intimate mixture comprising yttria and an alumina dopant; and forming an aqueous slurry comprising from about 1 weight percent to about 95 weight percent of the yttria-dopant mixture.

40. The method according to claim 39 wherein the intimate mixture comprises at least about 5 weight percent alumina.

* * * * *